(12) United States Patent
Yamamoto

(10) Patent No.: US 7,349,961 B2
(45) Date of Patent: Mar. 25, 2008

(54) DETECTING CONFIGURATION INCONSISTENCY IN STORAGE NETWORKS

(75) Inventor: Masayuki Yamamoto, Sunnyvale, CA (US)

(73) Assignee: Hitachi, Ltd., Tokyo (JP)

(*) Notice: Subject to any disclaimer, the term of this patent is extended or adjusted under 35 U.S.C. 154(b) by 627 days.

(21) Appl. No.: 10/013,418

(22) Filed: Dec. 7, 2001

(65) Prior Publication Data

US 2003/0208589 A1    Nov. 6, 2003

(51) Int. Cl.
G06F 15/173    (2006.01)
G06F 15/16     (2006.01)
G06F 15/177    (2006.01)

(52) U.S. Cl. .............. 709/224; 709/223; 709/220; 709/221; 709/217; 709/218; 707/10; 707/204

(58) Field of Classification Search ........... 709/224, 709/223, 213, 220; 714/37
See application file for complete search history.

(56) References Cited

U.S. PATENT DOCUMENTS

| | | | |
|---|---|---|---|
| 5,504,905 A * | 4/1996 | Cleary et al. ............... 713/100 |
| 5,651,006 A | 7/1997 | Fujino et al. |
| 5,761,428 A * | 6/1998 | Sidey ........................ 709/223 |
| 5,822,535 A * | 10/1998 | Takase et al. .............. 709/223 |
| 5,872,904 A | 2/1999 | McMillen et al. |
| 5,923,850 A | 7/1999 | Barroux |
| 5,941,972 A | 8/1999 | Hoese et al. |
| 5,959,994 A | 9/1999 | Boggs et al. |
| 6,006,019 A * | 12/1999 | Takei ......................... 709/224 |
| 6,078,990 A | 6/2000 | Frazier |
| 6,081,812 A | 6/2000 | Boggs et al. |
| 6,105,122 A | 8/2000 | Muller et al. |
| 6,115,713 A * | 9/2000 | Pascucci et al. ............. 707/10 |
| 6,148,349 A | 11/2000 | Chow et al. |
| 6,182,110 B1 | 1/2001 | Barroux |
| 6,220,768 B1 * | 4/2001 | Barroux ...................... 709/224 |
| 6,247,077 B1 | 6/2001 | Muller et al. |
| 6,256,740 B1 | 7/2001 | Muller et al. |
| 6,260,120 B1 * | 7/2001 | Blumenau et al. .......... 711/152 |
| 6,289,379 B1 * | 9/2001 | Urano et al. ................ 709/223 |
| 6,292,472 B1 | 9/2001 | Rariden et al. |

(Continued)

FOREIGN PATENT DOCUMENTS

EP    1115225 A2 *    7/2001

(Continued)

OTHER PUBLICATIONS

Burns, Randal et al. "Consistency and Locking for Distributing Updates to Web Servers Using a File System." ACM SIGMETRICS Performance Evaluation Review. Sep. 2000. vol. 28, Issue 2, pp. 15-21. ACM Press.*

(Continued)

*Primary Examiner*—Jason D Cardone
*Assistant Examiner*—Jeffrey R Swearingen
(74) *Attorney, Agent, or Firm*—Sughrue Mion, PLLC; Pavel I. Pogodin

(57) ABSTRACT

The present invention provides techniques for managing configurations within centralized storage management systems. Specific embodiments provide users such as IT managers the capability to check configurations of SAN devices in a system and detect any inconsistencies. Select embodiments provide users the capability to check changes to device configurations prior to actually implementing the changes.

22 Claims, 14 Drawing Sheets

Inconsistency List 14150 in Management Server 14000

| Device Name | Inconsistency Pair | Cause of Inconsistency | |
|---|---|---|---|
| | | Related Device Name | Cause |
| Server A | (a1, LU2) | Server A | LUN Masking permits the server to access the LU. But binding entry doesn't exist. |
| Server A | (a2, LU2) | Server A | LUN Masking prohibits the server from accessing the LU. But binding entry exists. |
| Server B | (b1, LU2) | Storage D | LUN Masking permits the server to access the LU. But LUN Security prohibits the LU from being accessed by the server. |
| Storage D | (c2, v2) | Server A | LUN Security prohibits the Volume from being accessed by the server. But binding entry exists. |
| Storage D | (b1, v1) | Switch C | LUN Security permits the Volume from being accessed by the server. But the server and the Volume are in seperate zones. |

U.S. PATENT DOCUMENTS

| | | | |
|---|---|---|---|
| 6,295,575 B1* | 9/2001 | Blumenau et al. | 711/5 |
| 6,421,711 B1* | 7/2002 | Blumenau et al. | 709/213 |
| 6,484,143 B1* | 11/2002 | Swildens et al. | 709/224 |
| 6,493,825 B1* | 12/2002 | Blumenau et al. | 713/168 |
| 6,502,162 B2* | 12/2002 | Blumenau et al. | 711/5 |
| 6,571,276 B1* | 5/2003 | Burns et al. | 709/224 |
| 6,584,499 B1* | 6/2003 | Jantz et al. | 709/223 |
| 6,618,823 B1* | 9/2003 | West | 714/25 |
| 6,636,981 B1* | 10/2003 | Barnett et al. | 709/224 |
| 6,701,449 B1* | 3/2004 | Davis et al. | 714/4 |
| 6,799,255 B1* | 9/2004 | Blumenau et al. | 711/152 |
| 6,834,298 B1* | 12/2004 | Singer et al. | 709/220 |
| 6,834,299 B1* | 12/2004 | Hamilton et al. | 709/224 |
| 6,850,989 B1* | 2/2005 | Lavian et al. | 709/242 |
| 6,950,871 B1* | 9/2005 | Honma et al. | 709/226 |
| 7,113,988 B2* | 9/2006 | Chirashnya et al. | 709/224 |
| 2001/0054093 A1 | 12/2001 | Iwatani | |
| 2002/0169901 A1* | 11/2002 | Fujibayashi et al. | 710/38 |
| 2003/0055932 A1* | 3/2003 | Brisse | 709/223 |
| 2003/0182422 A1* | 9/2003 | Bradshaw et al. | 709/225 |

FOREIGN PATENT DOCUMENTS

JP      02301338 A   *   12/1990

OTHER PUBLICATIONS

Gibson, Garth et al. "Network Attached Storage Architecture." Communications of the ACM. Nov. 2000. vol. 43, Issue 11, pp. 37-45. ACM Press.*

* cited by examiner

FIG. 2
Disk Port Table 11110
in Disk Subsystem D 11000

| Disk Port ID | WWN |
|---|---|
| d1 | WWNd1 |
| d2 | WWNd2 |
| d3 | WWNd3 |

210  220

FIG. 3
Volume Path Table 11120
in Disk Subsystem D 11000

| Path ID | Disk Port ID | Volume ID | SCSI ID | SCSI LUN |
|---|---|---|---|---|
| 1 | d1 | v1 | 2 | 1 |
| 2 | d1 | v2 | 3 | 1 |
| 3 | d2 | v3 | 4 | 1 |
| 4 | d2 | v2 | 4 | 2 |

310  320  330  340  350

FIG. 4
LUN Security Table 11130
in Disk Subsystem D 11000

410  420

| Volume ID | LUN Security Configuration List (Host Port ID) | | |
|---|---|---|---|
| | Host Port a1(WWNa1) | Host Port a2(WWNa2) | Host Port b1(WWNb1) |
| v1 | OK | NG | OK |
| v2 | NG | NG | NG |
| v3 | NG | NG | OK |

Port Link Table 12110
in FC Switch C 12000

| Switch Port ID | Switch Port WWN | Link WWN |
|---|---|---|
| s1 | WWNs1 | WWNa1 |
| s2 | WWNs2 | WWNa2 |
| s3 | WWNs3 | WWNb1 |
| s4 | WWNs4 | WWNd1 |
| s5 | WWNs5 | WWNd2 |
| s6 | WWNs6 | N/A |

Zoning Table 12120
in FC Switch C 12000

| Zone ID | Switch Port ID List |
|---|---|
| 1 | (s1, s2, s4) |
| 2 | (s3, s5, s6) |

Host Port Table 13110-a
in Server A 13000-a

| Host Port ID | WWN | SCSI ID |
|---|---|---|
| a1 | WWNa1 | 2 |
| a2 | WWNa2 | 3 |

Host Port Table 13110-b
in Server B 13000-b

| Host Port ID | WWN | SCSI ID |
|---|---|---|
| b1 | WWNb1 | 4 |

FIG. 8a
LUN Binding Table 13120-a
in Server A 13000-a

| Binding ID | Host Port ID | SCSI ID | LUN | Inquiry Information |
|---|---|---|---|---|
| LU1 | a1 | 2 | 1 | Vendor D, StorageD, Volume ID v1 |
| LU2 | a2 | 3 | 1 | Vendor D, StorageD, Volume ID v2 |

810　815　820　830　840

FIG. 8b
LUN Binding Table 13120-b
in Server B 13000-b

| Binding ID | Host Port ID | SCSI ID | LUN | Inquiry Information |
|---|---|---|---|---|
| LU1 | b1 | 4 | 1 | Vendor D, StorageD, Volume ID v3 |
| LU2 | b1 | 4 | 2 | Vendor D, StorageD, Volume ID v2 |

FIG. 9a
LUN Masking Table 13130-a
in Server A 13000-a

| Host Port ID (910) | LUN Masking Configuration List (Binding ID) (920) | |
|---|---|---|
| | LU 1 | LU 2 |
| a1 | OK | OK |
| a2 | NG | NG |

921　922

FIG. 9b
LUN Masking Table 13130-b
in Server B 13000-b

| Host Port ID | LUN Masking Configuration List (Binding ID) | |
|---|---|---|
| | LU 1 | LU 2 |
| b1 | OK | OK |

FIG. 10
Discovery List 14110
in Management Server 14000

| Discovery ID | Device Type | Device Information | IP Address |
|---|---|---|---|
| 1 | Server | Vendor A, ServerA | 100.100.100.100 |
| 2 | Server | Vendor B, ServerB | 100.100.100.101 |
| 3 | FC Switch | Vendor C, SwitchC | 100.100.100.102 |
| 4 | Disk Subsystem | Vendor D, StorageD | 100.100.100.103 |

1010  1020  1030  1040

FIG. 11
Topology Table 14130
in Management Server 14000

| Server | | | Interconnect | | | | Storage | | |
|---|---|---|---|---|---|---|---|---|---|
| Server Name | Binding ID | Host Port ID | Switch Name | Switch Port ID | Switch Name | Switch Port ID | Storage Name | Disk Port ID | Volume ID |
| Server A | LU1 | a1 | Switch C | s1 | Switch C | s4 | Storage D | d1 | v1 |
| Server A | LU2 | a2 | Switch C | s2 | Switch C | s4 | Storage D | d1 | v2 |
| Server B | LU1 | b1 | Switch C | s3 | Switch C | s5 | Storage D | d2 | v3 |

An Example of Configuration History Table 14140 in Management Server 14000

| Device Name (1210) | Time (1220) | Change in detail (1230) | |
|---|---|---|---|
| | | Add/Delete/Change (1231) | Detail (1232) |
| Server B | 09/10/2001 03:45:33 | Change | LUN Masking configuration for Port b1 |
| Storage D | 09/11/2001 18:33:50 | Add | LUN Security configuration for Volume v4 |
| Switch C | 09/13/2001 20:20:20 | Change | Zoning configuration |

FIG. 12b

Inconsistency List 14150 in Management Server 14000

| Device Name (1240) | Inconsistency Pair (1250) | Cause of Inconsistency (1260) | |
|---|---|---|---|
| | | Related Device Name (1261) | Cause (1262) |
| Server A | (a1, LU2) | Server A | LUN Masking permits the server to access the LU. But binding entry doesn't exist. |
| Server A | (a2, LU2) | Server A | LUN Masking prohibits the server from accessing the LU. But binding entry exists. |
| Server B | (b1, LU2) | Storage D | LUN Masking permits the server to access the LU. But LUN Security prohibits the LU from being accessed by the server. |
| Storage D | (a2, v2) | Server A | LUN Security prohibits the Volume from being accessed by the server. But binding entry exists. |
| Storage D | (b1, v1) | Switch C | LUN Security permits the Volume from being accessed by the server. But the server and the Volume are in seperate zones. |

General Processing Flow of SAN Manager 14100

An Example of
Detailed Processing Flow of Step 1350

An Example of
Detailed Processing Flow of Step 1351

An Example of
Detailed Processing Flow of Step 1352

An Example of Detailed Processing Flow of Step 1360

An Example of
Detailed Processing Flow of Step 1370

DETECTING CONFIGURATION INCONSISTENCY IN STORAGE NETWORKS

BACKGROUND OF THE INVENTION

The present invention relates generally to storage networks, and more particularly to techniques for centralized configuration management for servers, switches, and disk subsystems in storage networks.

Today, we have seen an explosive increase in data such as e-mails, web contents and so forth. In this situation, we face the difficulty of managing ever increasing amounts of data housed inside data centers while concurrently reducing the TCO (Total Cost of Ownership). Presently, Storage Area Networks (SANs), one type of networked storage solution, have become a common way to resolve the issues of managing the data and reducing the TCO. By applying the SANs to the data center, one of the benefits is "Storage Consolidation", that is, to share a single or a few large disk subsystems across a lot of servers or applications.

While SANs can achieve storage consolidation, opportunities for further improvements exist. For example, many SAN, devices, such as servers, switches, and disk subsystems, are in a SAN. Sometimes different IT administrators manage different devices, for example, IT managers for servers and IT managers for disk subsystems are different. In this situation, it is very difficult to keep a consistent configuration for all the SAN devices in a SAN.

What is needed are improved techniques for managing configurations within centralized storage management systems.

SUMMARY OF THE INVENTION

The present invention provides techniques for managing configurations within centralized storage management systems. Specific embodiments provide users such as IT managers the capability to check configurations of SAN devices in a system and detect any inconsistencies. Select embodiments provide users the capability to check changes to device configurations prior to actually implementing the changes.

In a representative embodiment according to the present invention, a method of managing a storage area network (SAN) is provided. The method is especially useful when operating in conjunction with a manager running on a management server. The management server can be connected to a plurality of servers, a disk subsystem and a switch connected to the servers and disk subsystem. A first agent that manages configuration of the server runs on each of the servers. A second agent that manages configuration of the disk subsystem runs on the disk subsystem. A third agent that manages configuration of the switch runs on the switch. The method comprises collecting configuration information from the first, second, and third agent. Detecting inconsistency among the collected information is also part of the method.

In a specific embodiment, the method can also include accepting input of a suggested change to at least one of configuration of the server, configuration of the disk subsystem, and configuration of the switch. Then, detecting an inconsistency in the configuration information collected from the first, second, and third agent and the suggested change is performed. The method also includes providing any inconsistency detected as a result. In some specific embodiments, the method further comprises receiving an input indicating whether to apply the suggested change and applying the suggested change if the input indicates to do so. Otherwise the suggested change is discarded.

In a specific embodiment, the method can also include receiving an indication of a failure and determining whether the failure was a result of a hardware fault. If the failure did not result from hardware fault, then detecting an inconsistency in the configuration information collected from the first, second, and third agent is performed. For each inconsistency detected, checking a configuration history for related entries and providing any related entries as a result can be part of the method.

In many embodiments, the method can include providing inconsistency information to users. In some embodiments, the method can include providing suggested changes to correct any inconsistencies. In specific embodiments, the method can include changing at least one of configuration of the server, configuration of the disk subsystem, and configuration of the switch to correct inconsistencies.

In some specific embodiments, detecting inconsistency among the collected information can include any of checking a consistency of masking configuration and/or checking a consistency of security configuration.

In some specific embodiments, checking a consistency of masking configuration can include for each pair of host port ID and binding ID in a collection of masking information, checking for existence of a corresponding entry for the pair in a collection of topology information.

In some specific embodiments, checking consistency of masking configuration can include determining whether a masking value for the pair is consistent with existence of an entry for the pair in the topology information and indicating that the masking value is consistent if the masking value and the entry for the pair are consistent, otherwise determining a source of inconsistency.

In some specific embodiments, determining a source of inconsistency includes indicating that an inconsistency arises from LUN masking prohibiting a server from accessing a logical unit even though a binding exists, if the masking value is NG and an entry exists, otherwise, determining whether binding information for the pair is inconsistent.

In some specific embodiments, determining whether binding information for the pair is inconsistent includes determining whether an entry for the pair exists in a collection of binding information and indicating that an inconsistency arises from LUN masking permitting a server to access a logical unit although no binding entry exists, if no entry exists, otherwise determining whether zone information for the pair is inconsistent.

In some specific embodiments, determining whether zone information for the pair is inconsistent includes determining whether a host port and logical unit are within a single zone and indicating that an inconsistency arises from LUN masking permitting a server to access a logical unit although server and logical unit are in separate zones, if host port and logical unit are not within a single zone, otherwise determining whether security information for the pair is inconsistent.

In some specific embodiments, determining whether security information for the pair is inconsistent includes determining whether a World Wide Name (WWN) associated with the host port ID is capable of accessing the logical unit and indicating that an inconsistency arises from LUN masking permitting a server to access a logical unit although LUN security prohibits access, otherwise indicating that the collection of topology information is internally inconsistent.

In specific embodiments, checking a consistency of security configuration includes for each pair of host port ID and volume ID in a collection of security information, checking for existence of a corresponding entry for the pair in a collection of topology information, determining whether a security value for the pair is consistent with existence of an entry for the pair in the topology information and indicating that the security value is consistent if the security value and the entry for the pair are consistent, otherwise determining a source of inconsistency.

In some specific embodiments, determining a source of inconsistency comprises indicating that an inconsistency arises from LUN security prohibiting a logical unit from being accessed by a server even though a binding exists, if the security value is NG and an entry exists, otherwise determining whether zone information for the pair is inconsistent.

In some specific embodiments, determining whether zone information for the pair is inconsistent comprises determining whether host port and volume within a single zone and indicating that an inconsistency arises from LUN security permitting a volume to be accessed by a server although server and volume are in separate zones, if host port and volume are not within a single zone; otherwise determining whether binding information for the pair is inconsistent.

In some specific embodiments, determining whether binding information for the pair is inconsistent includes determining whether an entry for the pair exists in a collection of binding information and indicating that an inconsistency arises from LUN security permitting a volume to be accessed by a server although no binding entry exists, if no entry exists, otherwise determining whether masking information for the pair is inconsistent.

In some specific embodiments, determining whether masking information for the pair is inconsistent includes determining whether the volume is capable of being accessed by the server and indicating that an inconsistency arises from LUN security permitting a volume to be accessed by a server although LUN masking prohibits access, otherwise indicating that the collection of topology information is internally inconsistent.

In a yet further representative embodiment according to the present invention, a method is provided. The method comprises obtaining configuration information from at least one of a first agent managing configuration of a server, a second agent managing configuration of a disk subsystem, and a third agent managing configuration of a switch. Detecting inconsistency among the configuration information is also part of the method.

In another representative embodiment according to the present invention, a management apparatus is provided. The management apparatus includes a means for collecting configuration information from at least one of a first agent managing configuration of a server, a second agent managing configuration of a disk subsystem, and a third agent managing configuration of a switch. Further, the apparatus includes a means for detecting inconsistency among the collected information.

In a further representative embodiment according to the present invention, a computer program product is provided. The computer program product comprises code that obtains configuration information from at least one of a first agent managing configuration of a server, a second agent managing configuration of a disk subsystem, and a third agent managing configuration of a switch. Further, code that detects inconsistency among the configuration information and a computer readable storage medium for containing the codes are also included in the computer program product.

In a yet further representative embodiment according to the present invention, a system is provided. The system comprises a storage area network (SAN); a management server, having a manager operable thereon. The management server is connected to a plurality of servers, a disk subsystem; and a switch. The switch is connected to the servers and the disk subsystem. A first agent managing configuration of the server runs on each of the servers, a second agent managing configuration of the disk subsystem runs on the disk subsystem and a third agent managing configuration of the switch runs on the switch. The manager collects configuration information from the first, second, and third agent, and the manager detects inconsistency among the collected information.

Numerous benefits are achieved by way of the present invention over conventional techniques. In specific embodiments of the present invention, SAN manager collects information from the servers, switched and disk subsystems in a SAN and provides a variety of management functions to IT administrators, including checking configuration inconsistency in a SAN, changing configuration with checking its consistency and failure analysis with checking SAN configuration.

Check Configuration Inconsistency in a SAN

It is very difficult for IT managers to check the configuration consistency in a SAN using conventional methods, because they need to gather the configuration information one by one from all the SAN devices such as servers, switches and disk subsystems, and check the interrelationship among them manually. In contrast, SAN managers can use specific embodiments of the present invention to retrieve the configuration information, check the interrelationship, and detect the inconsistency automatically. For example, SAN managers can detect that a server can't access the specified volume, which it is expected to be able to access, in a disk subsystem, because the server is in a separate zone of a switch from the disk subsystem.

Change Configuration with Checking its Consistency

Changing the configuration without any fault is another big challenge for IT administrators using conventional approaches, because if that change operation causes a configuration inconsistency in a SAN, the data center operations may be disrupted and it takes time to recover from the disruption. By using the techniques provided by specific embodiments of the present invention, such as described herein, IT managers can see whether the intended change operation to a given SAN device keeps the consistency with the SAN configuration.

Failure Analysis with Checking SAN Configuration

In some cases, IT administrators face events not related to the hardware failures. For example, someone changes a zoning configuration in a switch, and other IT manager sees "a server A can't access to the volume B" after a while, but no hardware failures is reported to the management console for each SAN device and SAN manager. In this case IT managers find it difficult to analyze the error in a SAN using conventional approaches because all the hardware is healthy and the configuration for each SAN device is consistent. Only the SAN configuration is inconsistent. In specific embodiments of the present invention, in additional to the techniques described herein above, the SAN manager keeps a history of the configuration for each SAN device, and the SAN manager can analyze the errors related to the SAN configuration inconsistency using the configuration history.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIGS. 2-4 illustrate representative tables in disk subsystems in specific embodiments of the present invention.

FIGS. 5-6 illustrate representative tables in Fibre Channel (FC) switches in specific embodiments of the present invention.

FIGS. 7a-9b illustrate representative tables in servers in specific embodiments of the present invention.

FIGS. 10-12b illustrate representative tables in management servers in specific embodiments of the present invention.

DESCRIPTION OF THE SPECIFIC EMBODIMENTS

Figure 1:
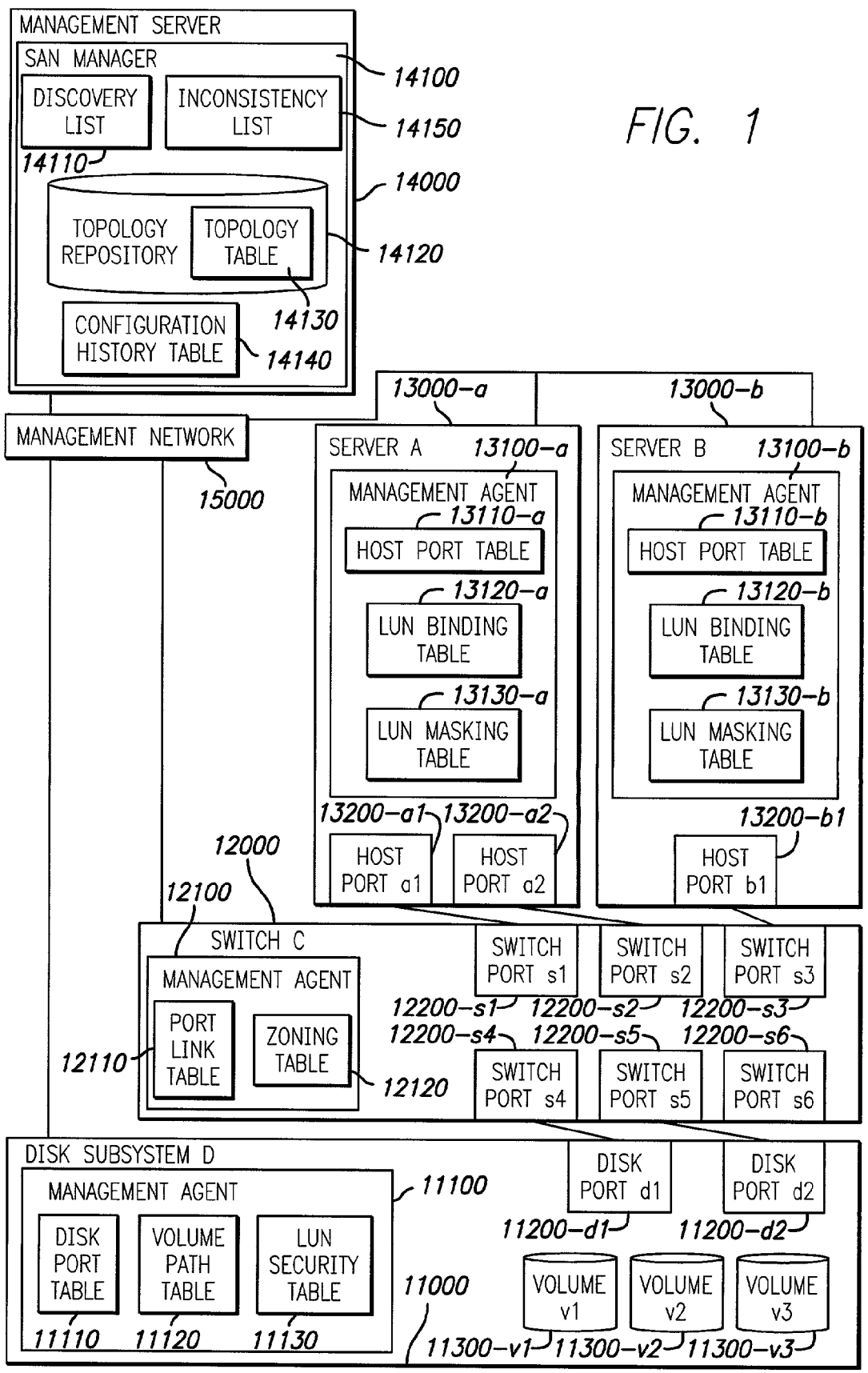
FIG. 1 illustrates an overall diagram of a representative disk subsystem in specific embodiment of the present invention.

The present invention provides techniques for managing configurations within centralized storage management systems. Specific embodiments provide users such as IT managers the capability to check configurations of SAN devices in a system and detect any inconsistencies. Select embodiments provide users the capability to check changes to device configurations prior to actually implementing the changes.

The operating systems that run on today's servers expect to have disk storage available for their exclusive use. Since the operating systems running on these servers think any storage they 'see' is exclusively theirs, as soon as more than one server is connected to a SAN, the data on the storage across the SAN is quickly scrambled. Therefore, some hardware or software method is used to allow multiple computers to harmoniously exist on the same SAN, connected to the same storage, all at the same time. Some techniques used to resolve these issues include Fibre Channel Switch Zoning and Fibre Channel LUN Masking.

Fibre Channel switch Zoning allows only specific ports on the switch to see other specific ports. Zoning can provide one particular computer connected to the SAN with a direct connection to one complete disk subsystem. Zoning assures that only the assigned server can 'see' it's assigned storage. In zoning techniques, one server is provided with a secure private wire connection through the Fibre Channel switch to a disk subsystem.

Fibre Channel LUN Masking goes one step beyond zoning by allowing only specific computers to see specific disk partitions (LUNs—Logical Unit Numbers) on a disk subsystem. LUNs are either individual disks, groups of disks, or individual parts of multiple disks defined by a disk subsystem. LUNs are sometimes also called 'volumes', 'logical disks', 'partitions' or 'virtual disks'. Because multiple LUNs may be designated on a single disk subsystem, via the Fibre Channel switch or hub, multiple servers may securely share a single wire connection to a disk subsystem with LUN Masking. For each computer connected to the storage network, LUN Masking effectively masks off the LUNs that are not assigned to it, allowing only the assigned LUNs to appear to the server's operating system. The hardware connections to other LUNs still exist, but the LUN masking makes those LUNs invisible.

LUN masking can be accomplished through hardware methods intelligent bridges, routers, or disk subsystems—or through software methods utilizing a small piece of driver-level code residing on each server connected to the Fibre Channel.

LUN masking techniques can provide a much more efficient use of the disk subsystem than zoning because LUN masking techniques allow multiple servers to share the bandwidth of a single disk subsystem. It is a rare application that can use all of the data bandwidth a disk subsystem can provide, all of the time. LUN masking allows more normal applications running on multiple servers to share all the data bandwidth of a disk subsystem by dividing the storage into logical partitions.

Also, LUN masking happens virtually instantly and non-destructively so LUN assignments to servers can be easily and quickly changed. For example, LUN 1 that was assigned to server A can be easily reassigned to server B in only seconds.

As used herein, to distinguish the server-based LUN Masking with the storage-based one, the server-based LUN Masking will be referred to as "LUN Masking", and storage-based LUN Masking as "LUN Security".

The present invention will now be discussed with reference to example embodiments, which disclose the configuration management functions provided herein. These embodiments are intended to be merely illustrative of the many possible configurations and techniques provided by the many embodiments of the present invention, and not intended to be limiting.

FIG. 1 illustrates an overall diagram of a representative disk subsystem in specific embodiment of the present invention. In a specific embodiment, there is one disk subsystem called "Disk Subsystem D" (11000) illustrated by FIG. 1. In specific embodiments of the present invention, there are one or more disk subsystems that support LUN Security function in a SAN. The disk subsystem (11000) comprises of a Management Agent (11100), a disk port (11200), and a volume (11300). Other components can also comprise the disk subsystem (11000) as well in various specific embodiments as will be readily apparent to those skilled in the art.

The management agent (11100) is located in a disk subsystem and manages the configuration of the disk subsystem. The management agent (11100) has three tables, a Disk Port Table 11110, a Volume Path Table 11120, and a LUN Security Table 11130. These tables will be described in greater detail herein below.

The Disk Port (11200) is a data connection port between servers and disk subsystems. There are one or more disk ports in a subsystem, and these disk ports may employ a variety of connection protocols, such as Fibre Channel, SCSI, FC over IP, and the like, in specific embodiments of the present invention. In this embodiment, "Disk Subsystem D" has two (2) Fibre Channel disk ports, "d1" and "d2".

Volume (11300) is a volume that is exported to the servers. The volume may be comprised of single physical disk drive, or multiple disk drives where the data is striped and managed by the disk array controller. That is, the physical structure of the volume doesn't matter in specific embodiments of the present invention. In this embodiment, "Disk Subsystem D" (11000) has three (3) volumes, "v1", "v2", and "v3".

FIG. 1 also illustrates a Switch (12000). The switch (12000) is the interconnect device between servers and disk subsystems. In specific embodiments of the present invention, there are one or more switches that support Zoning function in a SAN. The switch is connection protocol independent in specific embodiments of the present invention. In the embodiment illustrated by FIG. 1, there is one switch called "Switch C" (12000). The switch (12000) comprises of a management agent (12100), and a switch port (12200).

The Management Agent (11100) is located in a switch and manages the configuration of the switch. Also this agent has two tables, Port Link Table 12110, and Zoning Table 12120. These tables are explained in further detail herein below.

The Switch Port (12200) is a data interconnection port between servers and disk subsystems. There are one or more switch ports in a switch, and these switch ports may employ a variety of connection protocols, such as Fibre Channel, SCSI, FC over IP, and the like, in specific embodiments of the present invention. In this embodiment, "Switch C" has six (6) Fibre Channel switch ports from "s1" to "s6".

FIG. 1 also illustrates a Server (13000). Servers may be used for applications or for management. The "Server" 13000 is used for applications in a SAN. In specific embodiments of the present invention, there are one or more servers that support LUN Masking function in a SAN. In the embodiment illustrated by FIG. 1, there is two servers called "Server A" and "Server B". The server (13000) comprises of a management agent (13100) and a host port (13200).

The Management Agent (13100) is located in a server and manages the configuration of the server. This agent has three tables, a Host Port Table 13110, a LUN Binding Table 13120, and a LUN Masking Table 13130. These tables are explained in further detail herein below.

The Host Port (13200) is a data connection port between servers and disk subsystems. There are one or more host ports in a server, and these host ports may employ a variety of connection protocols, such as Fibre Channel, SCSI, FC over IP, and the like, in specific embodiments of the present invention. In this embodiment, "Server A" has two (2) Fibre Channel host ports, "a1" and "a2", and "Server B" has one (1) Fibre Channel host port, "b1".

FIG. 1 further illustrates a Management Server (14000). This "Management Server" is used for management in a SAN. In specific embodiments of the present invention, there is one management server where SAN Manager runs in a SAN. The management server comprises of a SAN Manager (14100), a topology repository (14120), and a variety of other tables.

The SAN Manager (14100) is located in a management server. SAN manager 14100 communicates with all the Management Agents, such as 11100, 12100, and 13100, in a SAN to get the configuration information tables via Management Network 15000.

The Topology Repository (14120) stores the tables from all the SAN devices such as Servers, Switches, and Disk Subsystems. Also, this repository stores the Topology Table 14130, which SAN Manager 14100 makes as the output of "Topology Discovery".

Other tables of the SAN Manager 14100 include a Discovery List 14110, a Configuration History Table 14140, and an Inconsistency List 14150.

FIG. 1 further illustrates a Management Network (15000). This is the network for communicating with Management Servers and all the SAN Devices to exchange the configuration tables. The management network (15000) is connection protocol independent, i.e., may employ any of Fibre Channel, SCSI, FC over IP, and the like, in specific embodiments of the present invention.

Figure 14A:
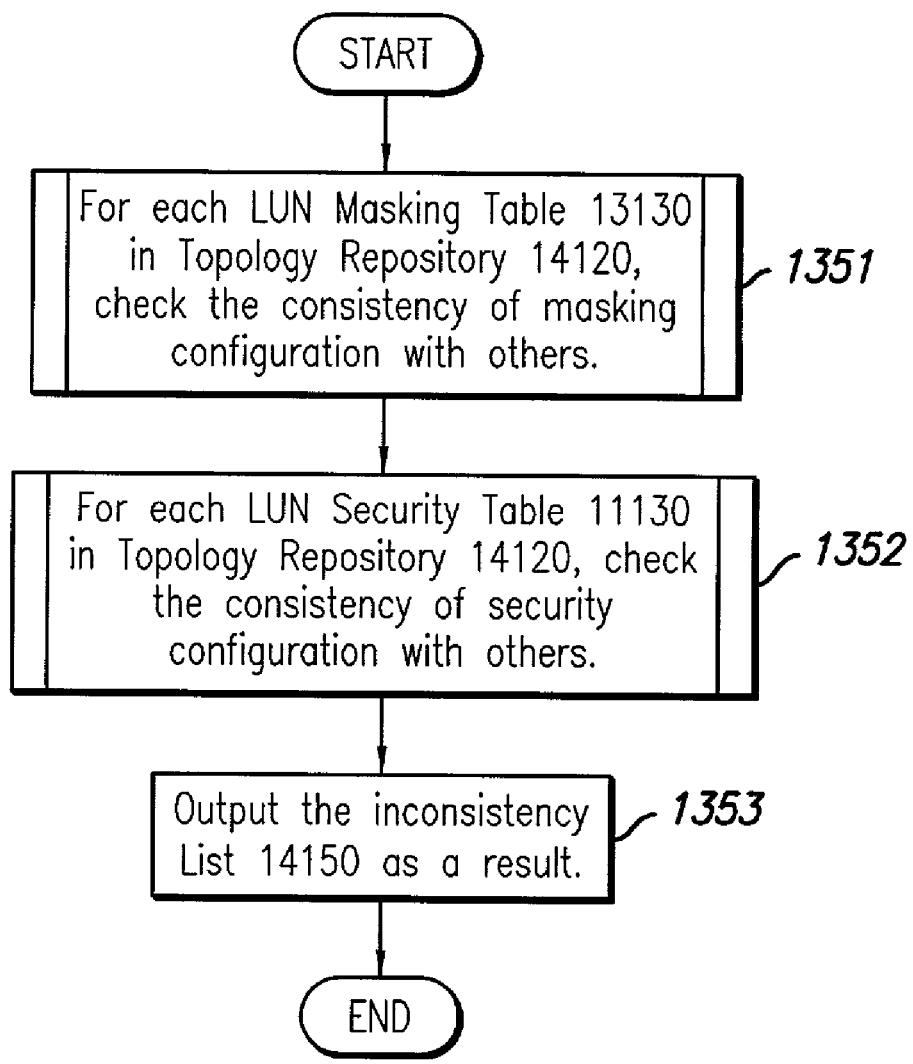
Figures 1, 14B:
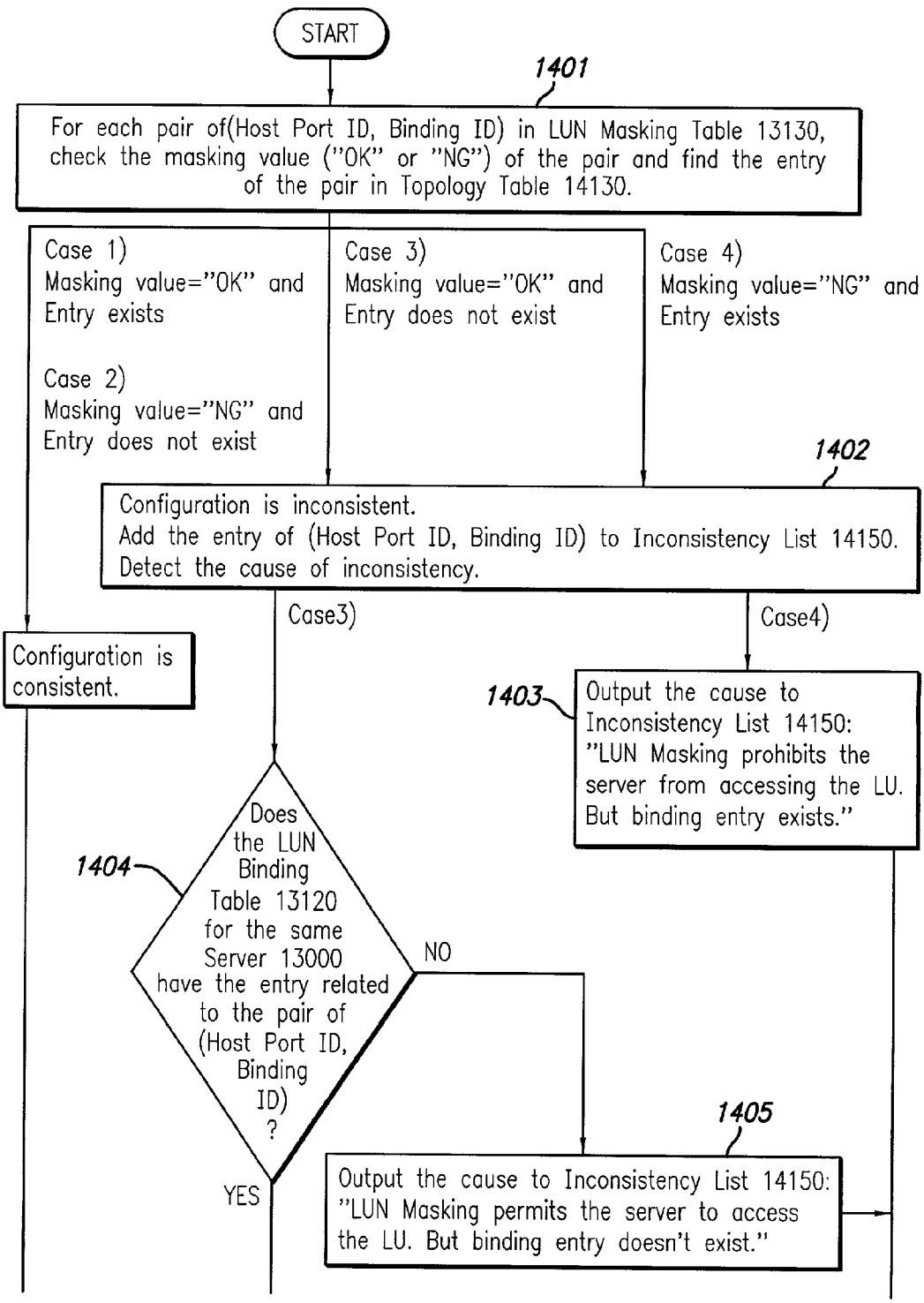
Figures 2, 14B:
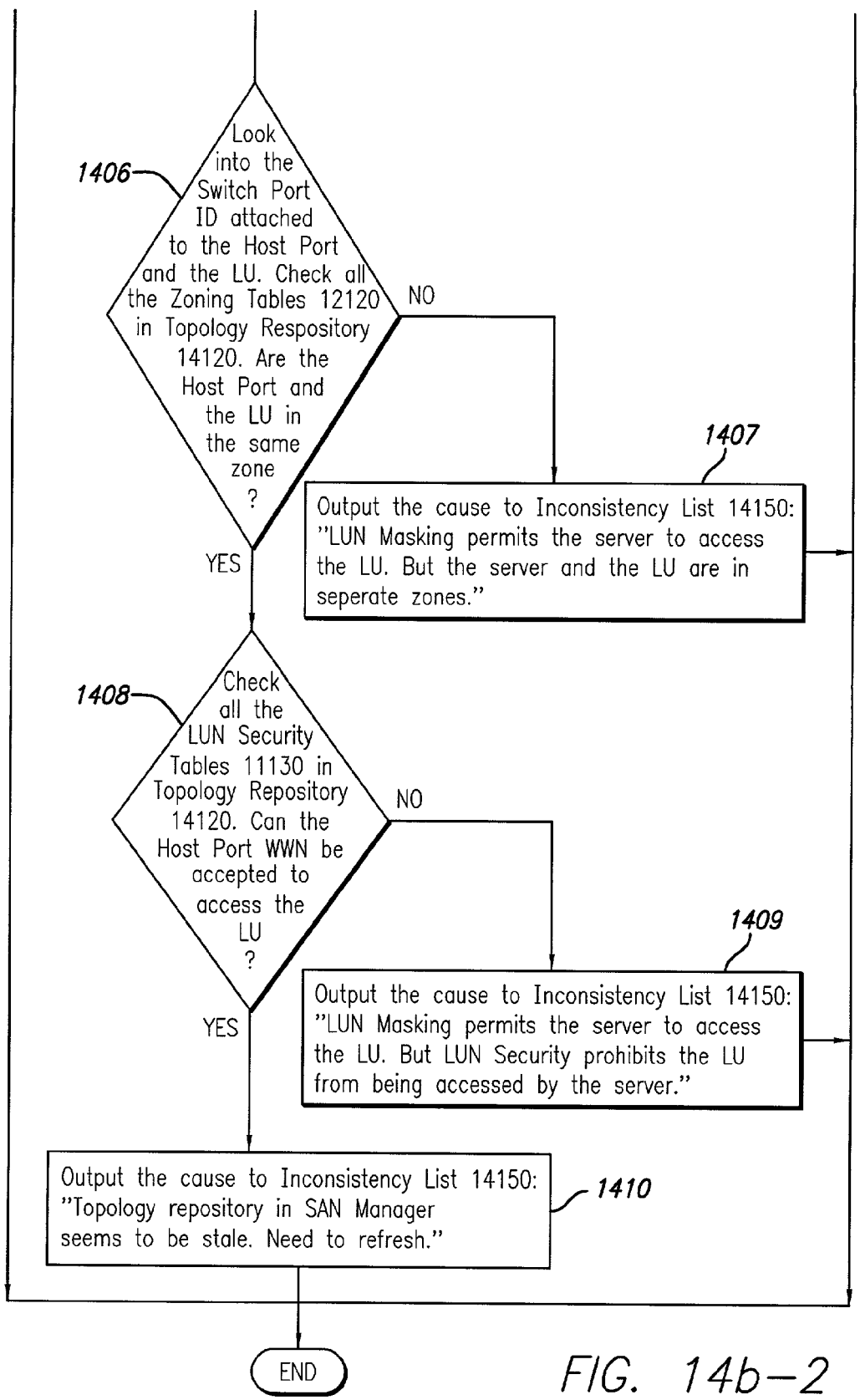

FIGS. 2-12 illustrate representative tables used in specific embodiments of the present invention. FIGS. 2-4 illustrate representative tables in disk subsystems in specific embodiments of the present invention.

FIG. 2 illustrates a representative Disk Port Table in a specific embodiment of the present invention. Disk Port Table (11110) provides the information of disk ports in a disk subsystem. In a specific embodiment, this table comprises columns for a Disk Port ID (210) and a WWN (220).

Disk Port ID (210) is a nickname for each disk port.

WWN (220) is a unique identifier of each disk port. In a Fibre Channel protocol, the World Wide Name (WWN) may be used.

FIG. 3 illustrates a representative Volume Path Table (11120) in a specific embodiment of the present invention. This table provides the information of the data I/O path from the disk port to the volume. This path is referred to as "Volume Path" or simply "Path". In a specific embodiment, this table comprises columns for a path ID (310), a disk port ID (320), a volume ID (330), a SCSI ID (340), and an SCSI LUN (350).

Path ID (310) is a nickname for the path.

Disk Port ID (320) is a Disk Port ID attached to the path.

Volume ID (330) is a nickname for the volume attached to the path.

SCSI ID (340) is a SCSI ID attached to the path. The IT administrators apply this value to the server as the SCSI ID.

SCSI LUN (350) is an SCSI LUN (Logical Unit Number) attached to the path. The IT administrators apply this value to the server as the SCSI LUN.

FIG. 4 illustrates a representative LUN Security Table (11130) in a specific embodiment of the present invention. This table provides the information of the LUN Security configuration in a disk subsystem. The LUN Security Table (11130) is the permission list for each Host Port in a SAN. When IT administrators specify the Host Port to access or not to access the specified volume, the Management Agent 11100 stores the LUN Security configuration in this table. In a specific embodiment, this table comprises columns for a volume ID (410) and a LUN security configuration list (420).

Volume ID (410) is a nickname for the volume applied the LUN Security. LUN Security Configuration List (420) is a List of permission settings for each Host Port in a SAN. This column has several sub-columns (421, 422, and 423), each of which is specified to the host port. If the specified Host Port can access the specified Volume, the value of its sub-column in the list is "OK". If not, the value is "NG".

FIGS. 5-6 illustrate representative tables in Fibre Channel (FC) switches in specific embodiments of the present invention.

FIG. 5 illustrates a representative Port Link Table (12110) in a specific embodiment of the present invention. This table provides the information of the interconnect relationship between servers and disk subsystems via switches, which will be referred to herein using the term "link". In a specific embodiment, this table comprises columns for a switch port ID (510), a switch port WWN (520), and a link WWN (530).

Switch Port ID (510) is a nickname for each switch port.

Switch Port WWN (520) is a unique identifier of each switch port. In a Fibre Channel protocol, the World Wide Name (WWN) may be used.

Link WWN (530) illustrates the target device WWN connected to this switch port. This WWN may be the host ports', other switch ports', or disk ports'.

FIG. 6 illustrates a representative Zoning Table (12120) in a specific embodiment of the present invention. This table provides the information of the Zoning configuration in a switch. Each entry in this table has the list of switch ports, of which the specified zone is comprised. The two (2) switch ports in the same zone can communicate with each other, but if the zone is different, they cannot. In a specific embodiment, this table comprises columns for a zone ID (610) and a switch port ID list (620).

Zone ID (610) is a nickname for each zone.

Switch Port ID List (620) is the list of switch ports, of which the zone is comprised.

FIGS. 7a-9b illustrate representative tables in servers in specific embodiments of the present invention.

FIGS. 7a-7b illustrate representative Host Port Tables (13110a and 13110b) in a specific embodiment of the present invention. These tables provide the information of host ports in server A (13000a) and server B (13000b). In a specific embodiment, these tables comprise columns for a host port ID (710), a WWN (720), and an SCSI ID (730).

Host Port ID (710) is a nickname for each host port.

WWN (720) is a unique identifier of each host port. In a Fibre Channel protocol, the World Wide Name (WWN) may be used.

SCSI ID (730) is a SCSI ID assigned to the specified Host Port by IT administrators. This ID is uniquely assigned in a single server.

FIGS. 8a-8b illustrate representative LUN Binding Tables (13120a and 13120b) in a specific embodiment of the present invention. These tables provide the information of the data I/O path from the host port to the SCSI LU (Logical Unit). This path will be referred to herein using the terms "LUN Binding" or simply "Binding". In a specific embodiment, these tables comprise columns for a binding ID (810), a host port ID (815), a SCSI ID (820), a LUN (830) and Inquiry Information (840).

Binding ID (810) is a nickname for the binding.

Host port ID (815) is a nickname for each host port.

SCSI ID (820) is the SCSI ID attached to the binding. This also illustrates the host port that this binding is assigned, because the SCSI ID is uniquely assigned to the host port in a server.

LUN (830) is the SCSI LUN (Logical Unit Number) attached to the binding.

Inquiry Information (840) is the information given by the LUN when servers issue the SCSI INQUIRY Command to the LUN. This information comprises items such as a vendor name, a product name, and a volume ID of the LUN.

FIGS. 9a-9b illustrate representative LUN Masking Tables (13130a and 13130b) in a specific embodiment of the present invention. These tables provide the information of the LUN Masking configuration in a disk subsystem. These tables are the permission list for each LUN in a SAN. When IT administrators specify the LUN to be accessed or not to be accessed by the specified host port, Management Agent 13100 stores the LUN Masking configuration in these tables. In a specific embodiment, these tables comprise columns for a host port ID (910) and an LUN masking configuration list (920).

Host Port ID (910) is a nickname for the host port applied the LUN Masking.

LUN Masking Configuration List (920) is a List of permission settings for each binding in a server. This column has several sub-columns (921 and 922), each of which is specified to the binding. If the specified host port can access the specified binding LU, the value of its sub-column in the list is "OK". If not, the value is "NG".

FIGS. 10-12b illustrate representative tables in management servers in specific embodiments of the present invention.

FIG. 10 illustrates a representative Discovery List (14110) in a specific embodiment of the present invention. This table provides the information of all the devices in a SAN. The SAN Manager 14000 uses this table to get the configuration information from the Management Agents in the SAN devices. In a specific embodiment, this table comprises columns for a discovery ID (1010), a device type (1020), device information (1030), and an IP address (1040).

Discovery ID (1010) is the nickname for the target SAN device to be discovered.

Device Type (1020) illustrates the device type of the entry. The SAN Manager uses this column to see what kind of tables SAN Manager gets.

Device Information (1030) is the detail information of the target SAN device.

IP Address (1040) is the communication point of the Management Agent in a target device. In a specific embodiment, the SAN Manager communicates with the SAN devices via TCP/IP. However, in other embodiments, other connection protocols may be used as apparent to those skilled in the art.

FIG. 11 illustrates a representative Topology Table (14130) in a specific embodiment of the present invention. This table provides the topology of the I/O communication in a SAN. The SAN Manager 14000 makes this table by merging the Disk Port Table 11110, Volume Path Table 11120, Port Link Table 12110, Host Port Table 13110, and LUN Binding Table 13130. In a specific embodiment, this table comprises columns for a server (1110), an interconnect (1120) and a storage (1130).

Server (1110) is a column that illustrates the server information in a topology entry. This column has a plurality of sub-columns, which provide detail information of the server. In a specific embodiment, these sub-columns include a Server Name (1111), a Binding ID (1112), and a Host Port ID (1113).

Interconnect (1120) is a column that illustrates the switch information in a topology entry. This column has a plurality of sub-columns, which provide detail information of the switch. In a specific embodiment, these sub-columns include a Switch Name (1121) and a Switch Port ID (1122) on one side, and a Switch Name (1123) and a Switch Port ID (1124) on the other side.

Storage (1130) is a column that illustrates the disk subsystem information in a topology entry. This column has a plurality of sub-columns, which provide detail information about the disk subsystem. In a specific embodiment, these sub-columns include a Storage Name (1131), a Disk Port ID (1132), and a Volume ID (1133).

FIG. 12a illustrates a representative Configuration History Table (14140) in a specific embodiment of the present invention. This table provides the history of changes to the configuration in a SAN. The SAN Manager 14000 stores the information when any SAN devices change the configuration. This table is used when SAN Manager 14000 analyzes the failure caused by the configuration inconsistency. In a specific embodiment, this table comprises columns for a device name (1210), a time (1220), and a change in detail (1230).

Device Name (1210) is a column that illustrates the device name to be changed.

Time (1220) is a column that illustrates the time when the device changes the configuration.

Change in detail (1230) is a column that illustrates the detail information of the configuration change. This column has a plurality of sub-columns, which provide detail information. In a specific embodiment, these sub-columns include an Add/Delete/Change (1231) that illustrates what kind of change occurs, and a Detail (1232) that illustrates the description of the change.

FIG. 12b illustrates a representative Inconsistency List (14150) in a specific embodiment of the present invention. This table provides the list of configuration inconsistency in a SAN detected by a SAN Manager 14000. In a specific embodiment, this table comprises columns for a device name (1240), an inconsistency pair (1250), and a cause of inconsistency (1260).

Device Name (1240) is a column that illustrates the device name which has the configuration inconsistency.

Inconsistency Pair (1250) is a column that illustrates the key index of the inconsistent configuration. For example, if the device name is a server, the pair is (Host Port ID, Binding ID). If the device name is a disk subsystem, the pair is (Volume ID, Host Port ID).

Cause of Inconsistency (1260) is a column that illustrates the detail information of the configuration inconsistency. This column has a plurality of sub-columns, which provide detail information. In a specific embodiment, these sub-columns include a Related Device Name (1261), the device name that is related to the configuration inconsistency, and a Cause (1262), the cause of the configuration inconsistency detected by a SAN Manager 14000.

FIGS. 13-16 illustrate flowcharts for the processing flows of a SAN Manager in specific embodiments of the present invention.

Figure 13:
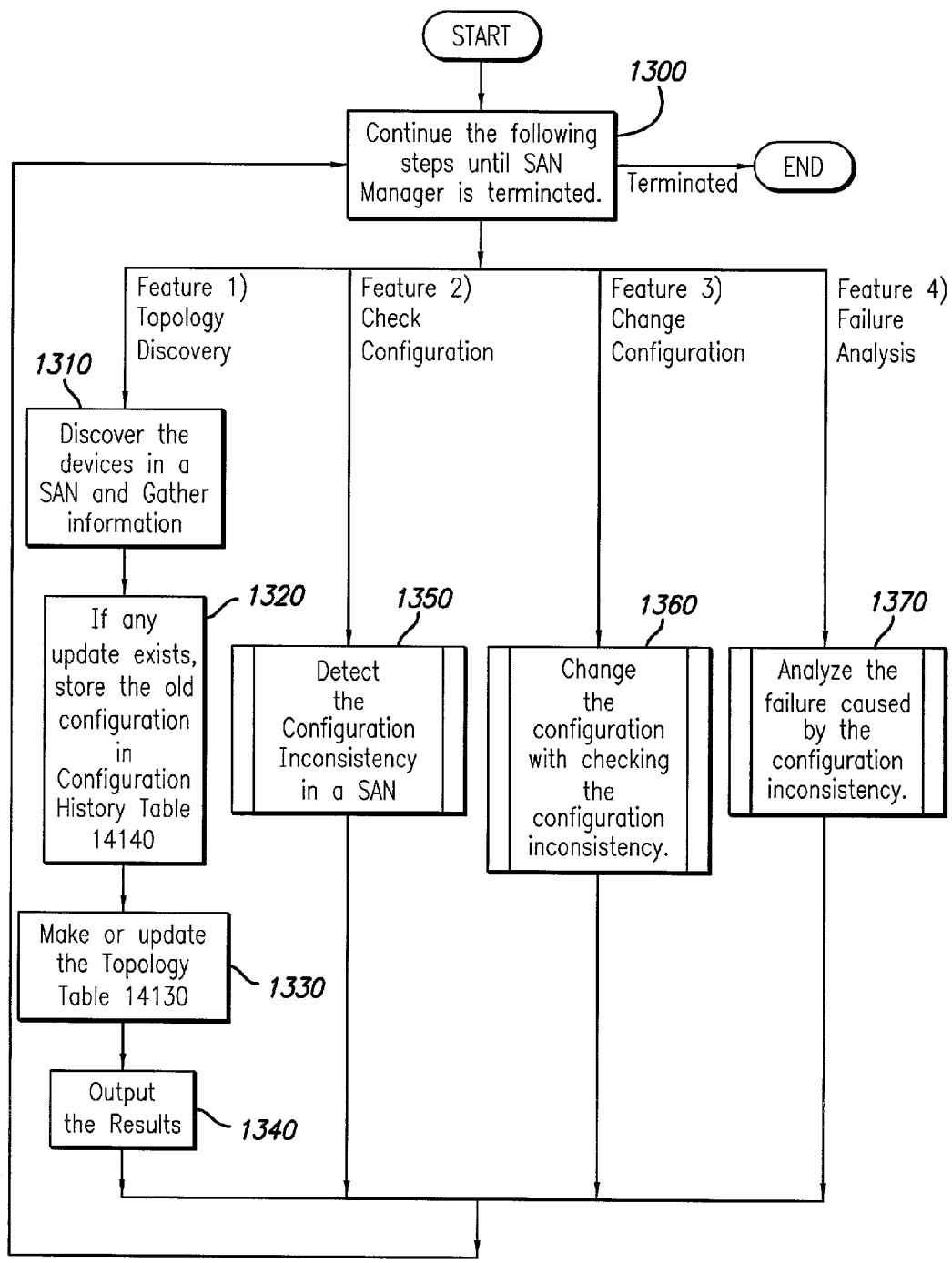
FIGS. 13-16 illustrate flowcharts for the processing flows of a SAN Manager in specific embodiments of the present invention.

FIG. 13 illustrates a flowchart of representative processing flow of SAN Manager 14000 in a specific embodiment of the present invention. The SAN Manager 14000 checks if processing has been terminated. [Step 1300] The SAN Manager 14000 continues processing management functions until processing is terminated. If terminated, end this flow. In a specific embodiment illustrated by FIG. 13, management functions include topology discovery, check configuration, change configuration and failure analysis.

Topology Discovery

The SAN Manager 14000 discovers the SAN devices based on the Discovery List 14110, and SAN Manager 14000 collects the configuration information from the Management Agent in a SAN device. [Step 1310] The SAN Manager 14000 stores all the configuration information in the Topology Repository 14120. If any updates exist, the SAN Manager 14000 stores the old configuration in the Configuration History Table 14140. [Step 1320] The SAN Manager 14000 makes or updates the Topology Table 14130 based on the Topology Repository 14120. [Step 1330] Then, the SAN Manager 14000 outputs the results. [Step 1340] Processing continues with step 1300.

Check Configuration

The SAN Manager 14000 detects the configuration inconsistency in a SAN. [Step 1350] This process will be described in greater detail herein below with reference to FIG. 14. Processing continues with step 1300.

Change Configuration

The SAN Manager 14000 checks the change of configuration specified by IT administrators, and if the change is consistent with the current SAN configuration, the SAN Manager 14000 changes the configuration. [Step 1360] This process will be described in greater detail herein below with reference to FIG. 15. Processing continues with step 1300.

Failure Analysis

The SAN Manager 14000 analyzes the failure received by a SAN device, and checks whether the failure is related to the configuration inconsistency. [Step 1370] This process will be described in greater detail herein below with reference to FIG. 16. Processing continues with step 1300.

FIG. 14a illustrates a flowchart of representative processing flow of step 1350 in a specific embodiment of the present invention. For each LUN Masking Table 13130 mirrored by Topology Repository 14120, the SAN Manager 14000 checks the consistency of masking configuration with other configurations such as LUN Security and Zoning. [Step 1351] For each LUN Security Table 11130 mirrored by Topology Repository 14120, the SAN Manager 14000 checks the consistency of security configuration with other configurations such as LUN Masking and Zoning. [Step 1352] The SAN Manager 14000 output the Inconsistency List 14150 as a result. [Step 1353]

FIG. 14b illustrates a flowchart of representative processing flow of step 1351 in a specific embodiment of the present invention. For each pair (Host Port ID, Binding ID) in LUN Masking Table 13130, the SAN Manager 14000 checks the masking value, "OK" or "NG". [Step 1401] The SAN Manager also checks whether the entry of the pair is in Topology Table 14130. By checking the masking value and the existence of the entry, the SAN Manager puts the pair into one of the following categories:

Case 1: The masking value is "OK" and the Entry exists in the Topology Table 14130.

Case 2: The masking value is "NG" and the Entry does not exist in the Topology Table 14130.

Case 3: The masking value is "OK" and the Entry does not exist in the Topology Table 14130.

Case 4: The masking value is "NG" and the Entry exists in the Topology Table 14130.

Case 1 and Case 2: The Configuration of the Pair is Consistent

If the SAN Manager 14000 determines that the pair is consistent, this processing ends, so that another pair, if any, may be checked.

Case 3 and Case 4: The Configuration of the Pair is Inconsistent

If the SAN Manager 14000 determines that the pair is inconsistent, then processing continues with step 1402. The SAN Manager 14000 adds the pair (Host Port ID, Binding ID) to Inconsistency List 14150. [Step 1402] If the inconsistency arose because the masking value is "OK" and the Entry does not exist in the Topology Table 14130 (Case 3), the processing continues with step 1404. Otherwise, If the inconsistency arose because the masking value is "NG" and the Entry exists in the Topology Table 14130 (Case 4), then processing continues with step 1403.

In the situation represented by case 4, the cause of this inconsistency exists both in LUN Masking configuration and the current topology. [Step 1403] The SAN Manager 14000 outputs the cause to the Inconsistency List 14150, and processing for this pair ends.

In the situation represented by case 3, the SAN Manager 14000 analyzes the cause of inconsistency. [Step 1404] The SAN Manager 14000 checks the LUN Binding Table 13120.

[Step 1404] If the table has the entry related to the pair, then processing continues with step 1406, otherwise go to step 1405.

If the result of step 1404 is "No", then the cause of this inconsistency exists both in LUN Masking configuration and the current topology. [Step 1405] The SAN Manager 14000 outputs the cause to the Inconsistency List 14150, and terminates processing for this pair.

If the result of step 1404 is "Yes", then the SAN Manager 14000 checks the Zoning Table 12120. [Step 1406] To check the Zoning Table 12120, the SAN Manager 14000 looks into the Switch Port ID attached to the Host Port and the LU. To look into the Switch Port ID attached to the Host Port; the SAN Manager 14000 uses the Host Port Table 13110 and Port Link Table 12110 in the repository. To look into the Switch Port ID attached to the LU; the SAN Manager 14000 uses the Disk Port Table 11110, Volume Path Table 11120, and Port Link Table 12110 in the repository. If both the Switch Port ID attached to the Host Port and the LU are in the same zone, processing continues with step 1408. Otherwise go to step 1407.

If the result of step 1406 is "No", the cause of this inconsistency exists both in LUN Masking configuration and Zoning configuration. [Step 1407] The SAN Manager 14000 outputs the cause to the Inconsistency List 14150, and terminates processing for this pair.

If the result of step 1406 is "Yes", the SAN Manager 14000 checks the LUN Security Table 11130. [Step 1408] If the pair is permitted access to the LU, then go to step 1410, otherwise go to step 1409.

If the result of step 1408 is "No", the cause of this inconsistency exists both in LUN Masking configuration and LUN Security configuration. [Step 1409] The SAN Manager 14000 outputs the cause to the Inconsistency List 14150, and terminates processing for this pair.

If the result of step 1408 is "Yes", then the cause of this inconsistency exists both in the topology information. [Step 1410] The SAN Manager 14000 outputs the cause to the Inconsistency List 14150, and terminates processing for this pair.

Figures 1, 14C:
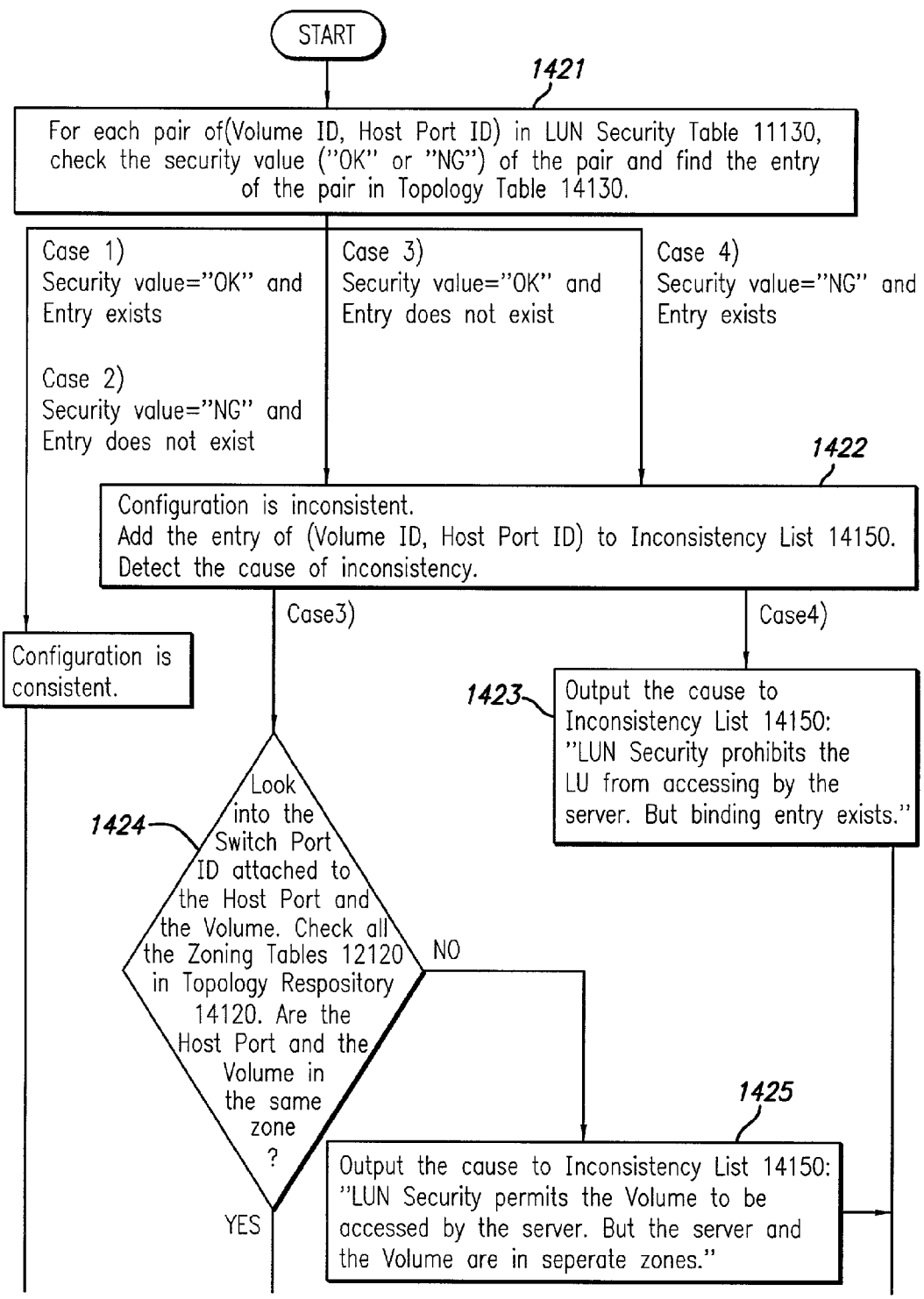
Figures 2, 14C:
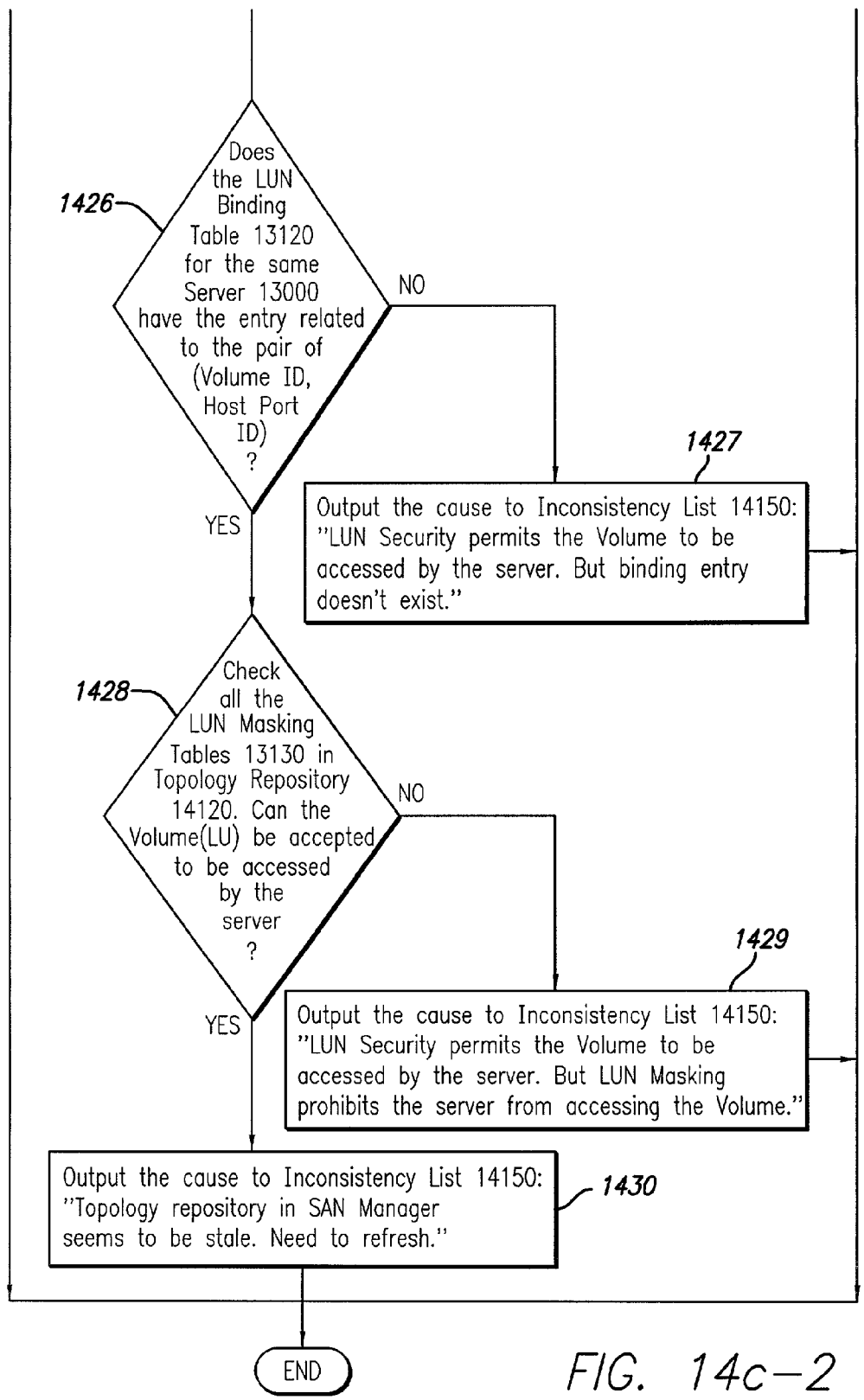

FIG. 14c illustrates a flowchart of representative processing flow of step 1352 in a specific embodiment of the present invention. For each pair (Volume ID, Host Port ID) in LUN Security Table 11130, the SAN Manager 14000 checks the security value, "OK" or "NG". [Step 1421] The SAN Manager also checks whether the entry of the pair is in Topology Table 14130. By checking the security value and the existence of the entry, SAN Manager puts the pair into one of the following categories:

Case 1: The security value is "OK" and the Entry exists in the Topology Table 14130.

Case 2: The security value is "NG" and the Entry does not exist in the Topology Table 14130.

Case 3: The security value is "OK" and the Entry does not exist in the Topology Table 14130.

Case 4: The security value is "NG" and the Entry exists in the Topology Table 14130.

Case 1 and Case 2: The Configuration of the Pair is Consistent

If the SAN Manager 14000 determines that the pair is consistent, this processing ends, so that another pair, if any, may be checked.

Case 3 and Case 4: The Configuration of the Pair is Inconsistent

If the SAN Manager 14000 determines that the pair is inconsistent, then processing continues with step 1422. The SAN Manager 14000 adds the pair (Volume ID, Host Port ID) to Inconsistency List 14150. [Step 1422] If the inconsistency arose because the security value is "OK" and the Entry does not exist in the Topology Table 14130 (Case 3), the processing continues with step 1424. Otherwise, if the inconsistency arose because the security value is "NG" and the Entry exists in the Topology Table 14130 Case (4), then processing continues with step 1423.

In the situation represented by case 4, the cause of this inconsistency exists both in LUN Security configuration and the current topology. [Step 1423] The SAN Manager 14000 outputs the cause to the Inconsistency List 14150, and processing for this pair ends.

In the situation represented by case 3, the SAN Manager 14000 analyzes the cause of inconsistency. [Step 1424] The SAN Manager 14000 checks the Zoning Table 12120. To check the Zoning Table 12120, SAN Manager 14000 looks into the Switch Port ID attached to the Host Port and the Volume. To look into the Switch Port ID attached to the Host Port; the SAN Manager 14000 uses the Host Port Table 13110 and Port Link Table 12110 in the repository. To look into the Switch Port ID attached to the Volume; SAN Manager 14000 uses the Disk Port Table 11110, Volume Path Table 11120, and Port Link Table 12110 in the repository. If the both Switch Port ID attached to the Host Port and the Volume are in the same zone, go to step 1426. Otherwise go to step 1425.

If the result of step 1424 is "No", then the cause of this inconsistency exists both in LUN Security configuration and Zoning configuration. [Step 1425] The SAN Manager 14000 outputs the cause to the Inconsistency List 14150, and terminates processing for this pair.

If the result of step 1424 is "Yes", then the SAN Manager 14000 checks the LUN Binding Table 13120. [Step 1426] If the table has the entry related to the pair, go to step 1428. Otherwise go to step 1427.

If the result of step 1426 is "No", then the cause of this inconsistency exists both in LUN Security configuration and the current topology. [Step 1427] The SAN Manager 14000 outputs the cause to the Inconsistency List 14150, and terminates processing for this pair.

If the result of step 1426 is "Yes", then the SAN Manager 14000 checks the LUN Masking Table 13130. [Step 1428] If the pair is permitted to access, go to step1430. Otherwise go to step 1429.

If the result of step 1428 is "No", then the cause of this inconsistency exists both in LUN Security configuration and LUN Masking configuration. [Step 1429] The SAN Manager 14000 outputs the cause to the Inconsistency List 14150, and terminates processing for this pair.

If the result of step 1428 is "Yes", then the cause of this inconsistency exists in the current topology information. [Step 1430] The SAN Manager 14000 outputs the cause to the Inconsistency List 14150, and terminates processing for this pair.

Figure 15:
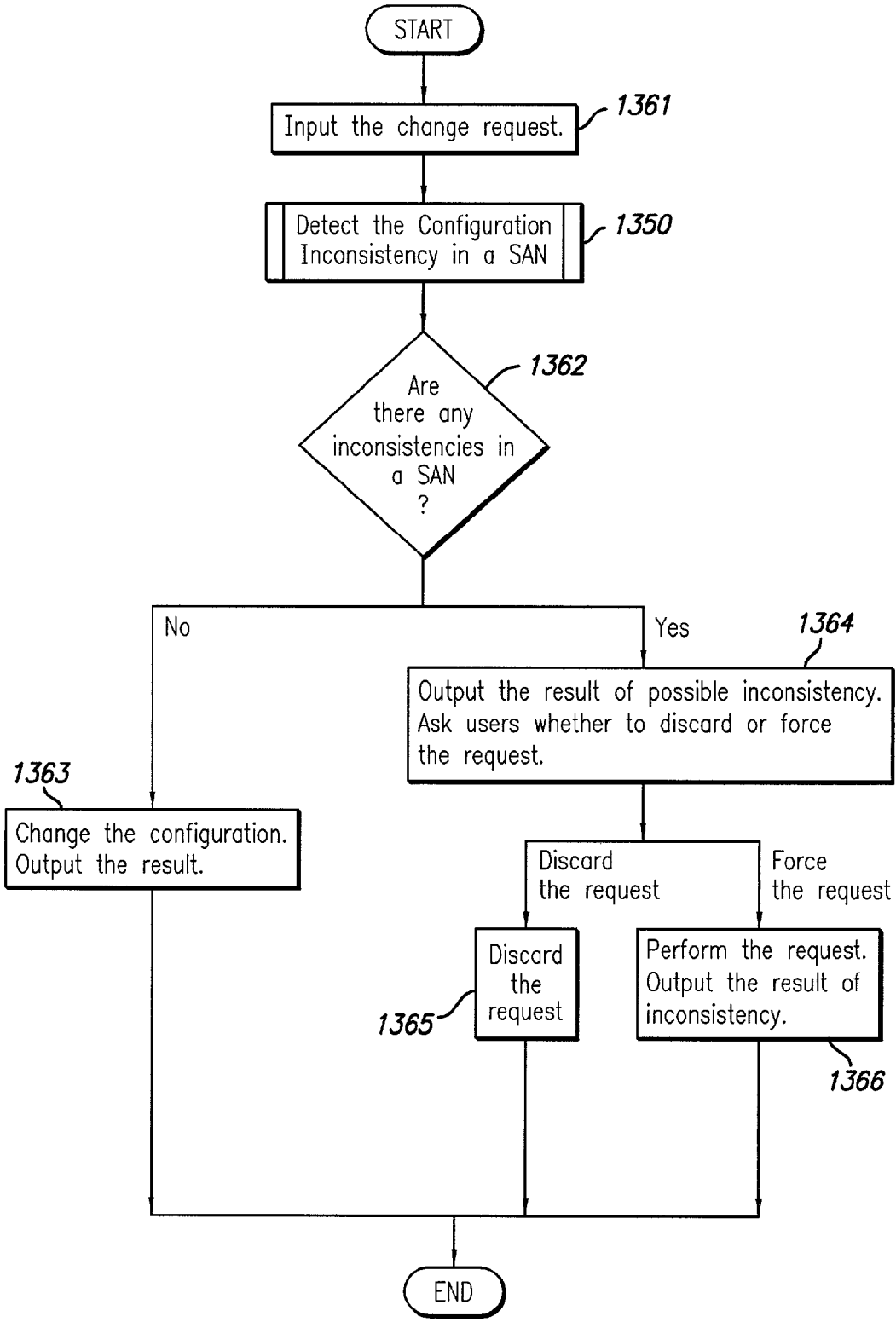

FIG. 15 illustrates a flowchart of representative processing flow of step 1360 in a specific embodiment of the present invention. Users, such as IT administrators, input a change request. [Step 1361] Then, configuration inconsistency detection processing is performed. [Step 1350] This processing is described herein above with reference to FIG. 14a. Then, the SAN Manager 14000 checks if there are any inconsistencies in the SAN as a result of step 1350. [Step 1362] If the SAN Manager 14000 found no inconsistencies, then processing continues with step 1363, otherwise go to step 1364.

If no inconsistencies were detected, then the SAN Manager 14000 changes the configuration, [Step 1363] and ends this flow. Otherwise, the SAN Manager 14000 outputs the result of step 1350 and asks users whether users discard or force the request. [Step 1364] If user indicates; "discard the request," then the SAN Manager 14000 discards the request, [Step 1365] and processing for this flow ends. Otherwise, if the user elects to force the request, then the SAN Manager 14000 performs the request, and outputs the result of inconsistency. [Step 1366] Processing for this flow ends.

Figure 16:
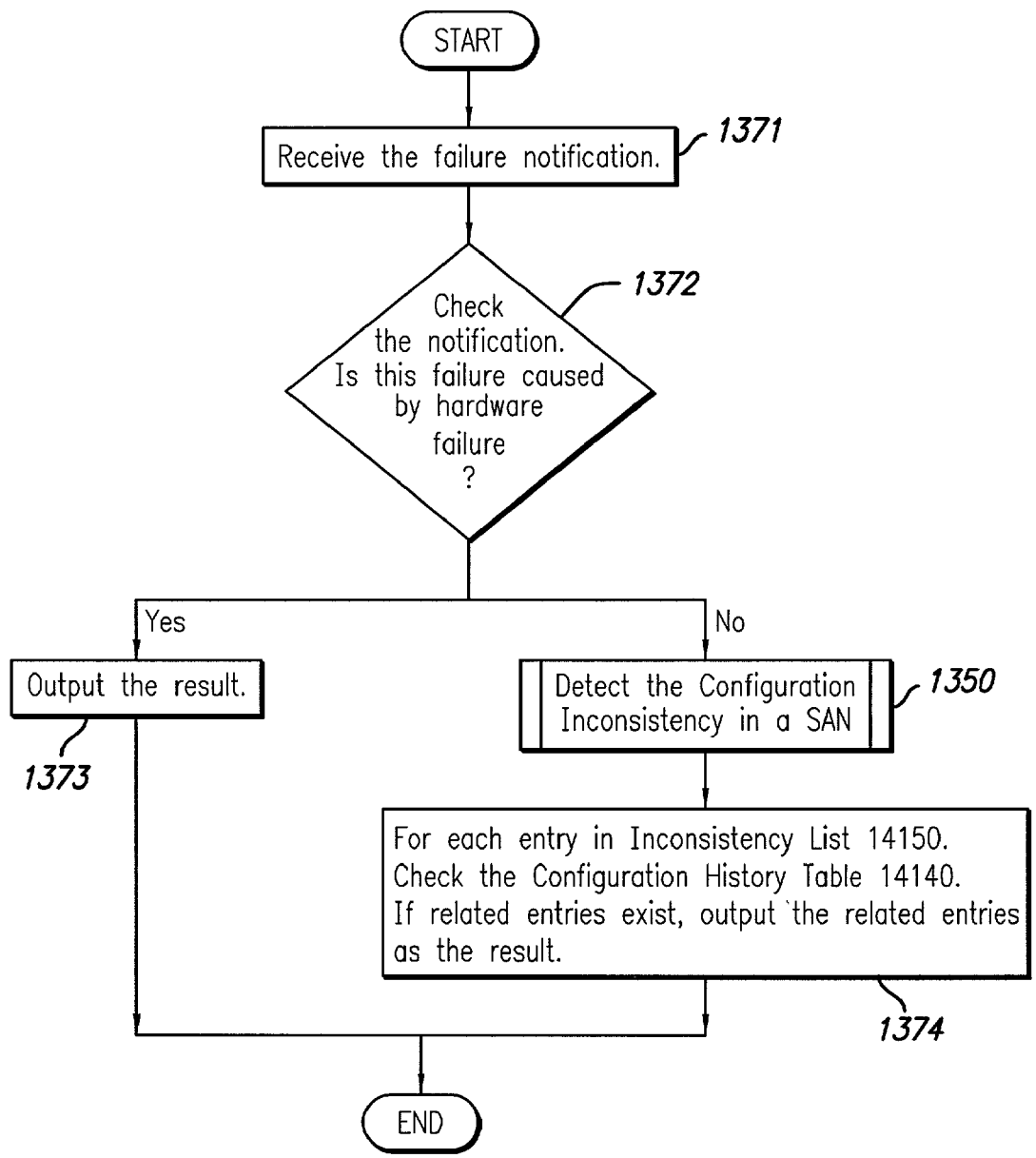

FIG. 16 illustrates a flowchart of representative processing flow of step 1370 in a specific embodiment of the present invention. The SAN Manager 14000 receives the failure notification from a SAN device. [Step 1371] Then, the SAN Manager 14000 checks the cause of this notification. [Step 1372] If this failure was caused by a hardware failure, go to step 1373. Otherwise go to step 1350. If this failure notification resulted from a hardware failure, the SAN Manager 14000 finishes the analysis and outputs the result. [Step 1373] Processing of this flow ends.

Otherwise, this failure notification may be caused by a configuration inconsistency. If so, then the SAN Manager 14000 performs configuration inconsistency detection processing, [Step 1350] as described herein above with reference to FIG. 14*a*, and then continues with step 1374. Next the SAN Manager 14000 checks the Inconsistency List 14150. [Step 1374] If the entry related to the failure exists, then the SAN Manager 14000 outputs it as the result, and processing for this flow ends.

CONCLUSION

Specific embodiments of the present invention can provide users (IT managers) with the central configuration management capability. Currently Storage Service Providers (SSPs) and enterprises have many large scale data centers in their IT environments. Every time a configuration is changed, the consistency of the configuration can be checked automatically using techniques according to specific embodiments of the present invention. The capability to detect configuration inconsistencies in a SAN provides IT administrators with the ability to both collect all the configuration information, and to check the consistency of the configuration information automatically from the single management console.

The preceding has been a description of the preferred embodiment of the invention. It will be appreciated that deviations and modifications can be made without departing from the scope of the invention, which is defined by the appended claims.

What is claimed is:

1. A method of managing a storage area network (SAN) at a manager running on a management server, wherein the management server is connected via a management network, separate from the storage area network, to a plurality of servers, a disk subsystem and a switch connected to the servers and disk subsystem, the plurality of servers, the disk subsystem and the switch constituting the storage area network, the method comprising, in response to a configuration change in the storage area network by an administrator:

providing a first agent on each of the servers for managing configuration of the server, each first agent capable of reporting configuration information of the server to the manager running on the management server via the management network;

providing a second agent on the disk subsystem for managing configuration of the disk subsystem, the second agent capable of reporting configuration information of the disk subsystem to the manager running on the management server via the management network;

providing a third agent on the switch for managing configuration of the switch, the third agent capable of reporting configuration information of the switch to the manager running on the management server via the management network;

collecting configuration information from each first agent, second agent, and third agent, wherein the configuration information is collected via the management network;

examining the configuration information collected, the configuration information comprising storage area network security information or storage area network switch zoning information;

detecting any inconsistencies in the configurations of the servers, switch and disk subsystem, by checking interrelationships among the servers, switch and disk subsystem based on the security information or the switch zoning information, wherein the detected inconsistencies comprise security-related inconsistencies or switch zoning-related inconsistencies;

determining a cause of the detected inconsistencies; and storing information on the detected inconsistencies and the determined cause.

2. The method of claim 1, further comprising:

accepting input of a suggested change to at least one of configuration of the server, configuration of the disk subsystem, and configuration of the switch;

thereupon detecting an inconsistency in the configuration information collected from the first, second, and third agent and the suggested change; and providing any inconsistency detected as a result.

3. The method of claim 2, further comprising:

receiving all input indicating whether to apply the suggested change; and applying the suggested change if the input indicates to do so, otherwise discarding the suggested change.

4. The method of claim 1, further comprising:

receiving an indication of a failure;

determining whether the failure was a result of a hardware fault;

if the failure did not result from hardware fault, then detecting an inconsistency in the configuration information collected from the first, second, and third agent;

for each inconsistency detected, checking a configuration history for related entries; and providing any related entries as a result.

5. The method of claim 1, further comprising:

providing inconsistency information to users.

6. The method of claim 1, further comprising:

providing suggested changes to correct any inconsistencies.

7. The method of claim 1, further comprising:

changing at least one of configuration of one of the servers, configuration of the disk subsystem, and configuration of the switch to correct inconsistencies.

8. The method of claim 1, wherein detecting inconsistency among the collected information comprises:

checking a consistency of masking configuration; and checking a consistency of security configuration.

9. The method of claim 1,
wherein the step of detecting any inconsistencies comprises:
for each pair of host port ID and binding ID in a collection of masking information, checking for existence of a corresponding entry for the pair in a collection of topology information;
determining whether a masking value for the pair is consistent with existence of an entry for the pair in the topology information; and
indicating that the masking value is consistent if the masking value and the entry for the pair are consistent;
otherwise determining a source of inconsistency.

10. The method of claim 9,
wherein determining a source of inconsistency comprises:
indicating that an inconsistency arises from LUN masking prohibiting a server from accessing a logical unit even though a binding exists, if the masking value is NG and an entry exists;
otherwise determining whether binding information for the pair is inconsistent.

11. The method of claim 10,
wherein determining whether binding information for the pair is inconsistent comprises:
determining whether an entry for the pair exists in a collection of binding information; and
indicating that an inconsistency arises from LUN masking permitting a server to access a logical unit although no binding entry exists, if no entry exists;
otherwise determining whether zone information for the pair is inconsistent.

12. The method of claim 11,
wherein determining whether zone information for the pair is inconsistent comprises:
determining whether a host port and logical unit are within a single zone;
indicating that an inconsistency arises from LUN masking permitting a server to access a logical unit although server and logical tuft are in separate zones, if host port and logical unit are not within a single zone;
otherwise determining whether security information for the pair is inconsistent.

13. The method of claim 12,
wherein determining whether security information for the pair is inconsistent comprises:
determining whether a World Wide Name (WWN) associated with the host port ID is capable of accessing the logical unit;
indicating that an inconsistency arises from LUN masking permitting a server to access a logical unit although LUN security prohibits access;
otherwise indicating that the collection of topology information is internally inconsistent.

14. The method of claim 1,
wherein the step of detecting any inconsistencies comprises:
for each pair of host port ID and volume ID in a collection of security information, checking for existence of a corresponding entry for the pair in a collection of topology information;
determining whether a security value for the pair is consistent with existence of an entry for the pair in the topology information; and
indicating that the security value is consistent if the security value and the entry for the pair are consistent;
otherwise determining a source of inconsistency.

15. The method of claim 14,
wherein determining a source of inconsistency comprises:
indicating that an inconsistency arises from LUN security prohibiting a logical unit from being accessed by a server even though a binding exists, if the security value is NG and an entry exists;
otherwise determining whether zone information for the pair is inconsistent.

16. The method of claim 15,
wherein determining whether zone information for the pair is inconsistent comprises:
determining whether host port and volume are within a single zone; and
indicating that an inconsistency arises from LUN security permitting a volume to be accessed by a server although server and volume are in separate zones, if host port and volume are not within a single zone;
otherwise determining whether binding information for the pair is inconsistent.

17. The method of claim 16,
wherein determining whether binding information for the pair is inconsistent comprises:
determining whether an entry for the pair exists in a collection of binding information; and
indicating that an inconsistency arises from LUN security permitting a volume to be accessed by a server although no binding entry exists, if no entry exists;
otherwise determining whether masking information for the pair is inconsistent.

18. The method of claim 17,
wherein determining whether masking information for the pair is inconsistent comprises:
determining whether the volume is capable of being accessed by the server;
indicating that an inconsistency arises from LUN security permitting a volume to be accessed by a server although LUN masking prohibits access;
otherwise indicating that the collection of topology information is internally inconsistent.

19. A method for managing a storage area network (SAN) the storage area network comprising a server, a disk subsystem and a switch, comprising:
providing a first agent for managing configuration of the server, the first agent capable of reporting configuration information of the server to a manager running on a management server via a management network, the management server connected to the server, the disk subsystem and the switch via the management network, separate from the storage area network;
providing a second agent for managing configuration of the disk subsystem, the second agent capable of reporting configuration information of the disk subsystem to the manager running on the management server via the management network;
providing a third agent for managing configuration of the switch, the third agent capable of reporting configuration information of the switch to the manager running on the management server via the management network;
obtaining by a manager configuration information from at least one of the first agent, the second agent, and the third agent, wherein the configuration is collected via the management network;
examining the obtained configuration information, the obtained configuration information comprising storage area network security information or storage area network switch zoning information;

detecting any inconsistencies in the configurations of the server, switch and disk subsystem, by checking interrelationships among the server, switch and disk subsystem based on the security information or the switch zoning information, wherein the detected inconsistencies comprise security-related inconsistencies or switch zoning-related inconsistencies;

determining a cause of the detected inconsistencies; and storing information on the detected inconsistencies and the determined cause.

20. A storage area network (SAN) configuration management apparatus, the storage area network comprising a server, a disk subsystem and a switch, comprising:

a first agent for managing configuration on a server, the first agent capable of reporting configuration information of the server to a manager running on a management server via a management network, the management server connected to the server, the disk subsystem and the switch via the management network, separate from the storage area network;

a second agent for managing configuration on a disk subsystem, the second agent capable of reporting the actual configuration of the disk subsystem to the manager running on the management server via the management network;

a third agent for managing configuration information on a switch, the third agent capable of reporting configuration information of the switch to the manager running on the management server via the management network;

means for collecting configuration information from at least one of the first agent, the second agent, and the third agent, wherein the configuration information is collected via the management network, means for examining the collected configuration information, the collected configuration information comprising storage area network security information or storage area network switch zoning information;

means for detecting any inconsistencies in the configurations of the server, switch and disk subsystem, the means for detecting any inconsistencies operable to check interrelationships among the server, switch and disk subsystem based on the security information or the switch zoning information, wherein the detected inconsistencies comprise security-related inconsistencies or switch zoning-related inconsistencies;

means for determining a cause of the detected inconsistencies; and means for storing information on the detected inconsistencies and the determined cause.

21. A computer program product for managing storage area network (SAN) configuration, the storage area network comprising a server, a disk subsystem and a switch, comprising:

code that is capable of requesting configuration information from a first agent about the server that it is managing, configuration information from the second agent about the disk subsystem that is managing, and configuration information from the third agent about the switch that it is managing;

code that obtains configuration information from at least one of the first agent about the server, the second agent about the disk subsystem, and the third agent about the switch, wherein the configuration information is collected via the management network, the management network, separate from the SAN, connecting the management server to the server, the disk subsystem and the switch;

code for examining the configuration information obtained, the configuration information comprising storage area network security information or storage area network switch zoning information;

code that detects inconsistencies in the configurations of the server, the disk subsystem and the switch, by checking interrelationships among the server, the switch and the disk subsystem based on the security information or the switch zoning information, wherein the detected inconsistencies comprise security-related inconsistencies or switch zoning-related inconsistencies;

code for determining a cause of the detected inconsistencies;

code for storing information on the detected inconsistencies and the determined cause; and a computer readable storage medium for containing the codes.

22. A system, comprising a storage area network (SAN);

a plurality of servers capable of accessing the SAN, the storage area network comprising a disk subsystem and a switch;

a management server, having a manager operable thereon, wherein the management server is connected to the plurality of servers, the disk subsystem and the switch via a management network separate from the SAN, a disk subsystem; and a switch, wherein the switch is connected to the servers and the disk subsystem;

wherein a first agent managing configuration of the server runs on each of the servers, each first agent capable of reporting configuration information of its server to the manager running on the management server via the management network, wherein a second agent managing configuration of the disk subsystem runs on the disk subsystem, the second agent capable of reporting configuration information of the disk subsystem to the manager running on the management server via the management network, wherein a third agent managing configuration of the switch runs on the switch, the third agent capable of reporting configuration information of the switch to the manager running on the management server via the management network, wherein the manager collects actual configuration information from the first, second, and third agents, the actual configuration information comprising storage area network security information or storage area network switch zoning information and wherein the configuration information is collected via the management network, wherein the manager examines the collected actual information; and wherein the manager detects any inconsistencies in the configurations of the servers, switch and disk subsystem, by checking interrelationships among the servers, switch and disk subsystem based on the security information or the switch zoning information, the detected inconsistencies comprising security-related inconsistencies or switch zoning-related inconsistencies;

wherein the manager determines a cause of the detected inconsistencies; and wherein the manager stores information on the detected inconsistencies and the determined cause.

* * * * *